United States Patent [19]

King et al.

[11] 3,962,527

[45] June 8, 1976

[54] NOVEL POLYMERS AND PHOTOGRAPHIC ELEMENTS CONTAINING SAME

[75] Inventors: James R. King; Hyman L. Cohen; Lewis M. Minsk, all of Rochester, N.Y.

[73] Assignee: Eastman Kodak Company, Rochester, N.Y.

[22] Filed: Jan. 18, 1974

[21] Appl. No.: 434,748

Related U.S. Application Data

[60] Division of Ser. No. 339,689, March 9, 1973, which is a division of Ser. No. 197,157, Nov. 9, 1971, Pat. No. 3,788,855, which is a division of Ser. No. 100,491, Dec. 21, 1970, Pat. No. 3,709,690, which is a continuation-in-part of Ser. No. 709,812, March 1, 1968, abandoned.

[52] U.S. Cl. .................................. 428/500; 428/517

[51] Int. Cl.$^2$ ..................... B32B 27/08; B32B 27/10

[58] Field of Search .............. 96/84 A, 114; 117/34, 117/DIG. 4; 428/411, 517, 500, 515

[56] References Cited

UNITED STATES PATENTS

| | | | |
|---|---|---|---|
| 2,075,190 | 5/1930 | Gasper | 96/99 |
| 2,675,316 | 4/1954 | Carroll et al | 95/8 |
| 2,780,604 | 2/1957 | Clarke et al | 260/2.1 E |
| 2,839,401 | 6/1958 | Gray et al | 96/114 |
| 3,048,487 | 8/1962 | Minsk et al | 96/84 A |
| 3,170,901 | 2/1965 | Melamed et al | 260/89.7 |
| 3,234,025 | 2/1966 | Van Hoff et al | 96/95 |
| 3,425,836 | 2/1969 | Perry et al | 96/114 |
| 3,488,706 | 1/1970 | Cohen et al | 96/114 |
| 3,625,694 | 12/1971 | Cohen et al | 96/114 |
| 3,788,855 | 1/1974 | Cohen et al | 96/84 A |
| 3,859,096 | 1/1975 | Burness et al | 96/84 A |
| 3,898,088 | 8/1975 | Cohen et al | 96/84 A |

*Primary Examiner*—Cameron K. Weiffenbach
*Assistant Examiner*—R. Eugene Varndell
*Attorney, Agent, or Firm*—A. H. Rosenstein

[57] ABSTRACT

Polymers comprising quaternary nitrogen atoms and at least two aromatic nuclei in the polymer cation for each quaternary nitrogen atom are described. In one embodiment at least ⅓ of the units of said polymer comprise quaternary nitrogen atoms. In another embodiment polymers comprising at least two aromatic nuclei in the polymer cation, such as aryl groups, for each quaternary nitrogen atom can be used in photograhic elements to provide excellent mordants for dyes.

3 Claims, No Drawings

NOVEL POLYMERS AND PHOTOGRAPHIC ELEMENTS CONTAINING SAME

This is a divisional of U.S. Ser. No. 339,689, filed Mar. 9, 1973.

U.S. Ser. No. 339,689 is a divisional of U.S. Ser. No. 197,157, now U.S. Pat. No. 3,788,855, filed Nov. 9, 1971.

U.S. Ser. No. 197,157 is a divisional of U.S. Ser. No. 100,491, now U.S. Pat. No. 3,709,690, filed Dec. 21, 1970.

U.S. Ser. No. 100,491 is a continuation-in-part of U.S. Ser. No. 709,812, now abandoned, filed Mar. 1, 1968.

This invention relates to novel polymeric compounds. In one aspect this invention relates to novel polymeric compounds which are good mordants for dyes used in photographic systems. In another aspect this invention relates to elements containing said polymers which are useful in photographic systems.

Various materials have been used as mordants in imbibition printing and in color photographic products etc. to prevent migration of dyes. Among the many mordants that have been employed are polymers containing acid salts such as are disclosed in U.S. Pat No. 3,048,487 and U.S. Pat. No. 3,184,309 both to Hyman L. Cohen and Louis M. Minsk. Mordants of these types exhibit good dye retention under certain conditions. However, those mordants can diffuse out of the blanks in which they are used and into the matrix when contacted therewith. The result is that as repeated dye transfers are made from a given matrix more mordant diffuses into the matrix, combines with some of the dye and is held there.

The mordant-dye complex formed in the matrix increases with successive transfers, finally reaching a point where it interferes with the transfer process so that satisfactory images cannot be made. It thus becomes necessary to subject the matrix to a special treatment between transfers thereby increasing the cost of the process. This special treatment, in addition to its cost, very often has a deleterious effect upon the image quality-definition, for example. Thus, it is desirable to provide a mordant which is substantially free of matrix poisoning.

Therefore, it is an object of the invention to provide new mordant compounds.

It is another object of the invention to provide new polymeric mordants with improved characteristics for acid dyes.

It is another object of this invention to provide new compositions containing the dye mordants which can be used in photography.

It is still another object to provide new photographic elements containing certain mordants which do not develop high levels of matrix stain or matrix poisoning upon repeated use in dye transfer processes.

It is still another object to provide new photographic layers in a dye image-receiving element composing mordants which do not develop high levels of stain or dye.

It is still another object to provide a new light-filtering layer coated from a composition comprising a hydrophilic colloid and a dye mordant composition of this invention.

It is a further object to provide a photographic element comprising a support, a silver halide layer and at least one layer which comprises a polymer of this invention.

Another object is to provide a silver halide emulsion containing the polymer of this composition.

Still another object is to provide an integral negative receiver photographic element comprising a support having thereon a layer containing the polymeric mordant of this invention and at least one photosensitive silver halide emulsion layer of which has contiguous thereto a dye image-providing material.

These and other objects are accomplished using a polymeric compound composed of a polymer having quaternary nitrogen groups and at least two aromatic nuclei for each quaternary nitrogen atom in the polymer cation (i.e. having at least two aromatic nuclei for each positively charged nitrogen atom), said polymeric compound being substantially free of carboxy groups. Compared to the prior art quaternary nitrogen-containing mordants wherein the nitrogen atom is alkyl-substituted, the aryl or aralkyl group-substituted polymers of the invention have been found to be superior mordants. While definition may or may not be affected, matrix poisoning and stain are greatly reduced. Moreover, it has also been found that matrix staining or poisoning bears a direct relationship to the average number of aryl or aralkyl groups per nitrogen atom in the carbon portion of the copolymers of the invention. We have found that as the average number of aryl or aralkyl groups in the cation portion increases, the matrix stain or poisoning decreases. Thus, the greater the average number of aryl or aralkyl groups per quaternized nitrogen atom in the cation portion of the aryl or aralkyl-substituted, quaternized nitrogen containing interpolymers, the more effective the mordant from the standpoint of matrix stain or poisoning prevention. The only limitation placed on the number of aryl or aralkyl groups per nitrogen atoms present in the copolymer is that dictated by water or methanol solubility and compatibility with the hydrophilic colloids.

Preferred polymers according to this invention comprise units of the following formula in copolymerized relationship with units of at least one other ethylenically unsaturated monomer.

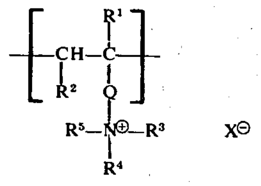

wherein $R^1$ and $R^2$ can each be hydrogen atoms, lower alkyl of 1 to 6 carbon atoms, such as methyl, ethyl, propyl, n-butyl, t-butyl, and the like, and $R^2$ can additionally be a group containing at least one aromatic nucleus, including substituted aryl, e.g., phenyl, tolyl, naphthyl, etc.; Q can be a divalent alkylene or arylene or aralkylene or arylenealkylene radical such as

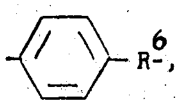

other radicals including

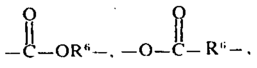

or

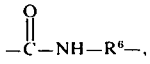

where $-R^6-$ is an alkylene radical typically having 1 to 4 carbon atoms or $R^2$ can be taken together with Q to form a

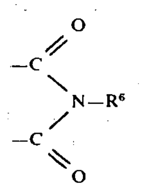
group;

$R^3$ and $R^4$, and $R^5$ are lower alkyl including substituted alkyl, e.g. aralkyl, cyanomethyl, alkoxymethyl, carboalkoxymethyl, carbamoylmethyl, etc., aryl including substituted aryl, e.g., phenyl, naphthyl, tolyl, etc., or $R^3$ and $R^4$ and the nitrogen atom to which they are attached can be taken with Q to represent the atoms and covalent bonds necessary to form a quaternized nitrogen-containing heterocyclic ring such as a 2-pyridinium

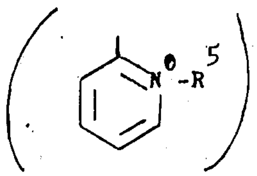

or a 3-pyridinium

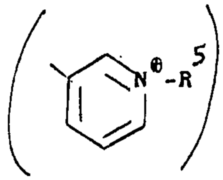

or a 4-pyridinium

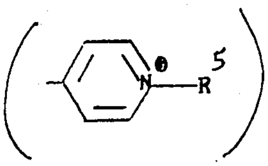

ring; and $X^-$ is an anion, i.e. a monovalent negative salt forming radical or atom in ionic relationship with the positive salt forming radical or polymer cation, such as a halide, alkyl sulfate, sulfonate, for example, such as p-toluenesulfonato, dialkyl phosphate, and the like; wherein said polymer is substantially free of carboxy groups and wherein said polymer cation, i.e., the positive salt forming radical of said polymer comprises at least two aromatic nuclei for each quaternary nitrogen atom in said polymer. In one embodiment of the invention ⅓ of said polymer is comprised of units represented by said formula. It is to be understood that Q cannot be taken together simultaneously with $R^2$, and $R^3$ and $R^4$.

The polymers of the invention are water or methanol soluble polymers having a polyhydrocarbon backbone and are composed of recurring units supplying quaternized nitrogen atoms and having at least two aromatic nuclei, such as aryl groups, e.g. phenyl, pyridinium, etc., per quaternized nitrogen atom. The polymers should be substantially free of carboxy groups for the presence of carboxy groups in the interpolymers interferes with effective dye mordanting.

It is understood that the aromatic nuclei can be located on any unit of the polymeric chain as long as there are two aromatic nuclei for each quaternized nitrogen atom in said polymer. In one preferred embodiment at least one of $R^3$, $R^4$ or $R^5$ in the above formula contain an aromatic nucleus. The aromatic nuclei contain at least 5 carbon atoms often 5 carbon atoms often 5-12 carbon atoms and can be represented by the structure:

$$A-(CH_2)_n-$$

wherein A is an aromatic nucleus which can be substituted, if desired, with non-interfering groups such as alkyl and nitro groups and *n* is an integer of 0 to 4. The aromatic nuclei of this invention contain at least one aryl group. Typical groups are phenyl, benzyl, naphthyl, phenethyl, phenylpropyl, naphthylmethyl, naphthylpropyl, biphenylyl, alkyl substituted phenyls, and the like. In general at least about ⅓ of the reoccurring units in the polymers which are good dye mordants contain quaternary nitrogen atoms.

The mordants of the invention are generally prepared by quaternizing an intermediate polymer having tertiary nitrogen atoms with an alkylating or aralkylation agent. The method of preparation of the intermediate polymer containing the tertiary nitrogen atoms for subsequent quaternization is not critical. Any of the methods known in the art such as mass, solution, or bead polymerization, as well as condensation polymerization, can be used, and the catalysts known to the art such as ultraviolet light, peroxides, azo compounds, e.g., azobisisobutyronitrile, etc. can be employed.

It is often advantageous to prepare the intermediate basic polymers as derived polymers such as, for example, the styrene-maleimide polymers described in Cohen and Minsk, U.S. Pat. No. 3,048,487 which are made by the reaction of a maleic anhydride interpolymer and a dialkylaminoalkylamine. Typical suitable intermediate polymers include copoly[styrene-N-(3-dimethylaminopropyl)acrylamide], copoly[styrene-N-(3-dimethylaminopropyl)maleimide], copoly(styrene-2-dimethylaminoethyl methacrylate), copoly(styrene-4-vinylpyridine), poly(2-vinylpyridine), copoly[2-vinylnaphthalene-N-(3-dimethylaminopropyl)-maloimide], copoly[4-vinylbiphenyl-N-(3-dimethylaminopropyl)-maleimide], copoly{styrene-1,1,4,4-tetramethylbutadiene-1-[2-(N,N-diethylamino)ethyl]maleimide}, copoly[p-nitrostyrene-1-(N,N-dimethylaminomethyl)maleimide], copoly{o-methylstyrene-1-[3-(N,N-dibutylamino)propyl]maleimide}, copoly{2,4-dichlorostyrene-N-[4-(N,N-dimethylamino)butyl]acrylamide}, copoly{-methylstyrene-N-[2-(N',N'-diethylamino)ethyl]methacrylamide}, copoly{styrene-N-[2-(N',N'-dimethylamino)ethyl]acrylamide}, copoly{4-cyanostyrene-N-[2-(N',N'-dimethylamino)ethyl]acrylamide}, copoly{4-chlorostyrene-N-[2-(N',N'-dibenzylamino)ethyl]acrylamide}, copoly[vinyl benzoate-vinyl-α-(N,N-dimethylamino)acetate], copoly{benzyl acrylate -1-[3-(N,N-dimethylamino)propyl]-maleimide}, copoly{phenyl acrylate-N-[3-(N',N'-diethylamino)-propyl]methacrylamide}, copoly{2-methylstyrene-N-[2-(N',N'-diethylamino)ethyl]methacrylamide}, copoly{styrene-1-[4-(N,N-dimethylamino)phenyl]maleimide}, copoly{styrene-1-[4-(N,N-diethylamino)phenyl]maleimide}, copoly{4-nitrostyrene-1-[4-N, N-diethylaminomethyl)phenyl]maleimide}, copoly{styrene-1-[4-(N,N-diethylaminomethyl)phenyl]maleimide}, copoly{styrene-1-[4-(N,N-dimethylaminomethyl)benzyl]maleimide}, poly(2-methyl-5-vinylpyridine), and the like.

Generally these intermediate polymers are addition copolymers comprising at least 30 mole percent of tertiary amine-containing units and preferably at least 50 mole percent, the remainder of the units being derived from other ethylenically unsaturated monomers.

In an alternate embodiment, the quaternary nitrogen-containing mordants of this invention can be prepared by reacting an intermediate polymer having recurring units containing an active halogen group, for example, a chloro-acetyl group, with a tertiary amine, preferably a tertiary amine containing at least one aryl or aralkyl group attached to the nitrogen atom, to obtain directly the quaternary nitrogen-containing mordants of the invention. Intermediate polymers which can be employed in this procedure include poly(vinyl chloroacetate) and copolymers of vinyl chloroacetate and other ethylenically unsaturated monomers. Typical suitable tertiary amines which may be employed in this alternate procedure include N,N-dimethylbenzylamino, N,N-dibenzylmethylamino, N,N-dimethylnaphthylmethylamino, pyridino, and the like.

Typical ethylenically unsaturated monomers which can be used to form ethenic interpolymers, including copolymers, terpolymers and the like, according to this invention include ethylene, propylene, 1-butene, isobutene, 2-methylpentene, 2-methylbutene, 1,1,4,4,-tetramethylbutadiene, styrene, alphamethylstyrene; monoethylenically unsaturated esters of aliphatic acids such as vinyl acetate, isopropenyl acetate, allyl acetate, etc.; esters of ethylenically unsaturated mono- or dicarboxylic acids such as methyl acrylate, methyl methacrylate, ethyl acrylate, diethyl methylenomalonate, etc.; monoethylenically unsaturated compounds such as acrylonitrile, allyl cyanide, and dienes such as butadiene and isoprene. In one embodiment a preferred class of ethylenically unsaturated monomers which may be used to form the ethenic polymers of this invention includes the lower 1-alkenes having from 1 to 6 carbon atoms, styrene, and tetramethylbutadiene.

Quaternization of tertiary nitrogen-containing groups in the interpolymer of the invention may be effected by using an alkylating or arylating agent which can be represented by the structure $R^5X$ wherein $R^5$ is as defined above, and X is a negative monovalent salt-forming atom or radical such as monoalkyl sulfate, sulfonate, dialkyl phosphate, halide, etc. Examples of suitable $R^5$ groups are methyl, ethyl, propyl, butyl, pentyl, and the like, phenyl, naphthyl, benzyl, phenethyl, phenylpropyl, naphthylmethyl, naphthylpropyl, and the like. The quaternizing agent selected can depend of course on whether or not the nitrogen atom appended to the interpolymer chain already contains an aromatic nucleus attached thereto. The quaternization may be effected in a solvent such as water, acetone, benzene, dimethylformamide, dimethylsulfoxide, dimethylacetamide, or an alcohol such as methanol, ethanol, isopropanol, 2-ethoxyethanol, (Cellosolve) and the like. Generally the quaternization is carried out to quaternize at least 30% and preferably 50% of tertiary nitrogen atoms. Temperatures from room temperature to 125°C. are generally used and if quaternization of only a part of the tertiary nitrogen atoms is desired, the amount of quaternizing agent may be reduced to correspond with the number of tertiary nitrogen atoms to be converted.

Some compounds which illustrate the mordants of the invention are the following:

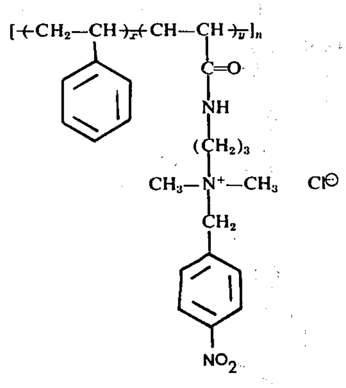

Copoly[styrene: N-(3-acrylamidopropyl)-N,N-dimethyl-N-(4-nitrobenzyl)ammonium chloride].

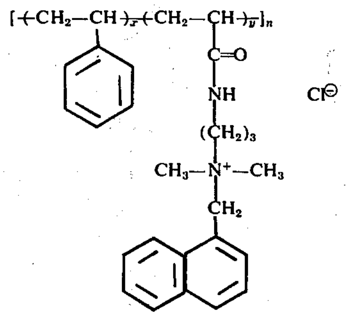

Copoly[styrene: N-(3-acrylamidopropyl)-N,N-dimethyl-N-(1-naphthylmethyl)ammonium chloride].

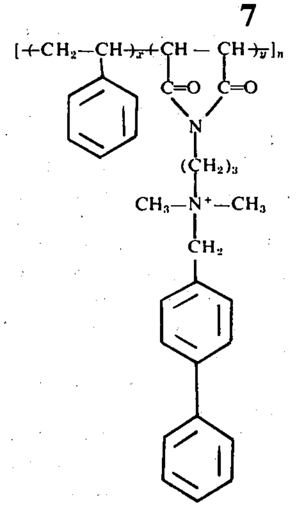

Copoly[styrene: N-(3-maleimidopropyl)-N,N-dimethyl-N-(4-phenylbenzyl)ammonium chloride].

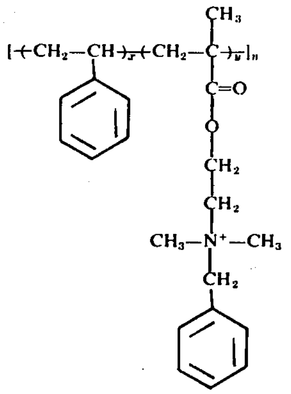

Copoly[styrene: N-(2-methacryloyloxyethyl)-N,N-dimethyl-N-benzylammonium chloride].

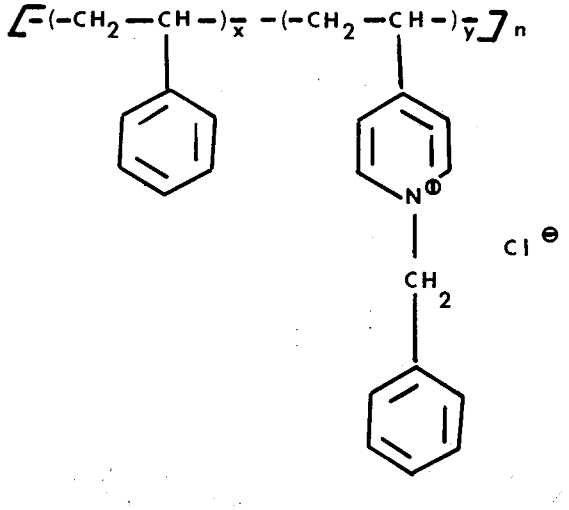

Copoly (styrene: 1-benzyl-4-vinylpyridinium chloride).

Other copolymers useful as mordants within the scope of this invention are illustrated by the following:

copoly[styrene-1,1,4,4-tetramethylbutadiene-N,N-diethyl-N-benzyl-N-(2-maleimidoethyl)ammonium bromide], copoly[styrene-1,1,4,4-tetramethylbutadiene-N,N-diethyl-N-benzyl-N-(2-maleimidoethyl)ammonium iodide], copoly[styrene-1,1,4,4-tetramethylbutadiene-N,N-diethyl-N-benzyl-N-(2-maleimidoethyl)ammonium p-toluenosulfonate], copoly[styrene-1,1,4,4-tetramethylbutadiene-N,N-diethyl-N-benzyl-N-(2-maleimidoethyl)ammonium acetate], copoly[styrene-1,1,4,4-tetramethylbutadiene-N,N-diethyl-N-benzyl-N-(2-maleimidoethyl)ammonium methyl sulfonate], copoly[styrene-1,1,4,4-tetramethylbutadiene-N,N-diethyl-N-benzyl-N-(2-maleimidoethyl)ammonium chloride], copoly(p-nitrostyrene-N,N-dimethyl-N-naphthylmethyl-N-maleimidomethylammonium chloride), copoly(p-nitrostyrene-N,N-dimethyl-N-naphthylmethyl-N-maleimidomethylammonium bromide), copoly(p-nitrostyrene-N,N-dimethyl-N-naphthylmethyl-N-maleimidomethylammonium iodide), copoly(p-nitrostyrene-N,N-dimethyl-N-naphthylmethyl-N-maleimidomethylammonium p-toluenesulfonate), copoly(p-nitrostyrene-N,N-dimethyl-N-naphthylmethyl-N-maleimidomethylammonium acetate), copoly(p-nitrostyrene-N,N-dimethyl-N-naphthylmethyl-N-maleimidomethylammonium methylsulfonate), copoly(p-nitrostyrene-N,N-dimethyl-N-naphthymethyl-N-maleimidomethylammonium chloride), copoly[o-methylstyrene-N,N-dibutyl-N-(4-biphenylylmethyl)-N-(3-maloimidopropyl)ammonium acetate], copoly[o-methylstyrene-N,N-dibutyl-N-(4-biphenylylmethyl-N(3-maleimidopropyl)ammonium bromide], copoly[o-methylstyrene-N,N-dibutyl-N-(4-biphenylylmethyl)-N-(3-maleimidopropyl)ammonium iodide], copoly[o-methylstyrene-N,N-dibutyl-N-(4-biphenylylmethyl)-N-(3-maleimidopropyl)ammonium p-toluenesulfonate], copoly[o-methylstyrene-N,N-dibutyl-N-(4-biphenylylmethyl)-N-(3-maleimidopropyl)ammonium methylsulfonate], copoly[o-methylstyrene-N,N-dibutyl-N-(4-biphenylylmethyl)-N-(3-maloimidopropyl)ammonium chloride], copoly[2,4-dichlorostyrene-N,N-dimethyl-N-phenethyl-N-(4-acrylamidobutyl)ammonium iodide], copoly[2,4-dichlorostyrene-N,N-dimethyl-N-phenethyl-N-(4-acrylamidobutyl)ammonium bromide], copoly[2,4-dichlorostyrene-N,N-dimethyl-N-phenethyl-N-(4-acrylamidobutyl)ammonium acetate], copoly[2,4-dichlorostyrene-N,N-dimethyl-N-phenethyl-N-(4-acrylamidobutyl)ammonium methylsulfonate], copoly[4-methylstyrene-N,N-dimethyl-N-phenethyl-N-(4-acrylamidobutyl)ammonium chloride], copoly[4-methylstyrene-N,N-diethyl-N-(3,5-diethylbenzyl)-N-(2-methacrylamidoethyl)ammonium chloride],
copoly[styrene-N,N-dimethyl-N-(2-acrylamidoethyl)-N-(4-nitrophenyl)ammonium chloride],
copoly[4-cyanostyrene-N,N-dimethyl-N-(4-chlorobenzyl)-N-(2-acrylamidoethyl)ammonium chloride],
copoly[4-chlorostyrene-N,N-dibenzyl-N-(2-acrylamidoethyl)-N-(4-t-butylbenzyl)ammonium chloride],
copoly(vinyl benzoate-N,N-dimethyl-N-benzyl-N-vinyloxycarbomethylammonium chloride),
copoly[benzyl acrylate-N,N-dimethyl-N-naphthylmethyl-N-(3-maleimidopropyl)ammonium chloride],
copoly[phenyl acrylate-N,N-diethyl-N-(4-ethylbenzyl)-N-(3-methacrylamidopropyl)ammonium bromide],
copoly[2-methylstyrene-N,N-dimethyl-N-(4-phenylbenzyl)-N-(2-methacrylamidoethyl)ammonium bromide],
copoly[styrene-N-(4-maleimidophenyl)-N,N,N-trimethylammonium p-toluenesulfonate],
copoly[styrene-N-benzyl-N,N-diethyl-N-(4-maleimidophenyl)ammonium methosulfate],
copoly[4-nitrostyrene-N-(4-maleimidobenzyl)-N,N,N-triethylammonium bromide],
copoly[styrene-N-benzyl-N,N-dimethyl-N-(4-maleimidobenzyl)ammonium methosulfate],
copoly[styrene-N-(4-maleimidomethylbenzyl)-N,N,N-trimethylammonium p-toluenesulfonate],
copoly[styrene-N-benzyl-N,N-dimethyl-N-(4-maleimidomethylbenzyl)ammonium chloride],
copoly[styrene-N-benzyl-N-carbamoylmethyl-N-(3-maleimidopropyl)-N-methylammonium chloride],
copoly[2-methyl-5-vinylpyridine-1-benzyl-2-methyl-5-vinylpyridinium chloride],
copoly[styrene-N-benzyl-N-ethoxycarbonylmethyl-N-(3-maleimidopropyl)-N-methylammonium chloride],
copoly[styrene-N-benzyl-N-cyanomethyl-N-(3-maleimidopropyl)-N-methylammonium chloride], and
copoly[styrene-N-benzyl-N-cyanomethyl-N-(3-maleimidopropyl)-N-methylammonium chloride].

As indicated above, interpolymers of the above polymers useful as mordants within the scope of the invention can also contain units derived from more than one polymerizable ethylenically unsaturated monomer including ethylene, isobutylene, propylene, 2-methylbutene, 2-methylpentene, 2-methylhexene, 2-methylheptene, 2-methyloctene, 1,1,4,4-tetramethylbutadiene and alkyl or aryl acrylates such as methyl acrylate and phenyl acrylate, or alkyl or aryl methacrylates, such as methyl methacrylate and phenyl methacrylate.

This invention can be further illustrated by the following examples of preferred embodiments thereof although it will be understood that these examples are included for purposes of illustration.

EXAMPLE I

Preparation of Copoly[styrene : N-(3-acrylamidopropyl)-N,N-dimethyl-N-4-nitrobenzylammonium chloride]

Into a 300 ml, 1-neck flask fitted with a magnetic stirrer and condenser is placed a solution of 26 g (0.1 mole) of copoly(styrene : N,N-dimethylaminopropylacrylamide), dissolved in 150 ml of benzyl alcohol. To this solution is added 18 g (0.105 mole) of alpha-chloro-p-nitrotoluene. The solution is then stirred at ambient temperature for 20 hours. The viscous dope is poured into 2 liters of stirred ethyl acetate and the precipitate is filtered by suction and washed in fresh ethyl acetate. The precipitate is filtered and dried at room temperature under reduced pressure. Yield 38 g of water-soluble product.

Anal. Calcd.: Cl, 8.2; N, 9.8. Found: Cl, 6.5; N, 7.7.

EXAMPLE II

Preparation of Copoly[styrene : N-(3-acrylamidopropyl)-N,N-dimethyl-N-(1-naphthylmethyl)ammonium chloride]

Into a 500 ml, 3-neck flask fitted with a magnetic stirrer, condenser, and thermometer is placed 250 ml of distilled dimethylformamide and 13 g (0.05 mole) of copoly(styrene : 3-dimethylaminopropylacrylamide). This mixture is stirred to a homogeneous solution at room temperature at which time 17.6 g (0.1 mole) of 1-chloromethylnaphthalene is added in bulk. The solution is then stirred at ambient temperature for 48 hours, then at 96°C. for 1 hour. The viscous dope is filtered by suction and the filtrate is poured into 2 liters of manually stirred diethyl ether. The precipitate is hardened and washed in fresh diethyl ether overnight. The precipitate is filtered and dried at room temperature under reduced pressure. Yield 19.6 g, soluble in (3-1) water methanol.

Anal. Calcd.: Cl, 8.1; N, 6.4. Found: Cl, 8.3; N, 6.3.

EXAMPLE III

Preparation of Copoly[styrene : N-(3-acrylamidopropyl)-N-benzyl-N,N-dimethylammonium chloride]

To a solution of 14.3 g (0.05 mole) of copoly (styrene : N,N-dimethylaminopropylacrylamide) dissolved in 150 ml of benzyl alcohol is added 12.6 g (0.1 mole) of alphachlorotoluene. The resulting solution is then tumbled for 48 hours at 30°C. The viscous dope is poured into 1.5 liters of stirred diethyl ether. The precipitate is filtered off, washed and hardened in fresh ether, filtered off and dried at room temperature under reduced pressure. Yield 15.4 g of water-soluble product.

Anal. Calcd.: C, 71.1; H, 8.3; Cl, 9.11; N, 6.6. Found: C, 71.5; H, 8.3; Cl, 7.3; N, 6.3.

EXAMPLE IV

Preparation of Copoly[styrene : N-(3-maleimidopropyl)-N,N-dimethyl-N-(4-phenylbenzyl)ammonium chloride]

Into a 500 ml, 3-neck flask fitted with mechanical stirrer, condenser, and thermometer, is placed 14.3 g (0.05 mole) of copoly[styrene : N-(3-dimethylaminopropyl)maleimide] and 250 ml of distilled dimethylformamide. This mixture is stirred to a homogeneous solution at room temperature at which time 20.2 g (0.1 mole) of 4-chloromethylbiphenyl is added. The mixture is stirred at ambient temperature for 48 hours then at 96°C. for 1 hour. The viscous dope is filtered by suction and the filtrate is poured into 2 liters of manually stirred diethyl ether. The precipitate is hardened and washed in fresh diethyl ether overnight. The precipitate is then filtered by suction and dried at room temperature under reduced pressure. Yield 12 g of water-soluble polymer.

EXAMPLE V

Preparation of Copoly[styrene : N-(2-methacryloyloxyethyl)-N,N-dimethyl-N-benzylammonium Chloride]

Into a 500 ml, 3-neck flask fitted with magnetic stirrer, condenser and thermometer, is placed 250 ml of distilled dimethylformamide and 13 g (0.05 mole) of copoly (styrene : 2-dimethylaminoethyl methacrylate). This mixture is stirred to a homogeneous solution at room temperature at which time 12.6 g (0.1 mole) of alpha-chlorotoluene is added. The solution is stirred at ambient temperature for 48 hours, then at 96°C. for 1 hour. The dope is then precipitated into 2 liters of manually stirred diethyl ether. The precipitate is washed and hardened in fresh diethyl ether overnight. The precipitate is filtered by suction and dried at room temperature under reduced pressure. Yield 17.7 g of water-soluble product.

Anal. Calcd.: Cl, 9.2; N, 3.7. Found: Cl, 9.4; N, 3.6.

EXAMPLE VI

Preparation of Terpoly(styrene : 4-Vinyl-N-benzylpyridinium Chloride : 4-vinylpyridinium acetate)

In a 500 ml, 3-neck flask, fitted with condenser, magnetic stirrer, and thermometer, is prepared a solution of 20.9 g (0.1 mole) of copoly(styrene : 4-vinylpyridine) in 200 ml benzyl alcohol at room temperature. To this solution is added 25.2 g (0.2 mole) of alpha-chlorotoluene and the solution is stirred at ambient temperature for 20 hours. The solution is then stirred and heated at 95°C. for 1 hour. The dope is slowly poured into 2 liters of diethyl ether. The white precipitate is hardened and washed in 2 liters of fresh diethyl ether, filtered by suction and dried at room temperature under reduced pressure. The precipitate is redissolved in 250 ml. of methanol and again precipitated into ethyl ether, washed and dried as above. Yield 27.4 g.

Anal. Calcd.: Cl, 10.5; N, 4.2. Found: Cl, 10.2; N, 3.8.

The dried product is dispersed in distilled water and just enough acetic acid was added to effect solution.

EXAMPLE VII

Preparation of Copoly[2-vinylpyridine : 2-vinyl-N-(1-naphthylmethyl)pyridinium chloride]

Into a 500 ml, 1-neck flask fitted with condenser and magnetic stirrer, is placed a solution of 21 g (0.2 mole) of poly(2-vinylpyridine) dissolved in 250 ml of dimethylforamide. To this solution is added 52.8 g (0.3 mole) of 1-chloromethylnaphthalene. The solution is stirred and heated at 80°C. for 42 hours. The viscous dope is poured into diethyl ether and the resulting precipitate is washed in fresh diethyl ether. The precipitate is filtered by suction and dried at room temperature under reduced pressure. Yield 22 g of water-soluble product.

Anal. Calcd.: Cl, 12.5; N, 4.9. Found: Cl, 7.8; N, 9.5.

EXAMPLE VIII

Quaternization of Copoly[styrene : dimethylaminopropylmaleimide] with 1-chloromethylnaphthalene A solution of 6.5 g of copoly[styrene : dimethylaminopropylmaleimide] and 3.8 g of 1-chloromethylnaphthalene in 100 ml of benzyl alcohol is heated on a steambath overnight. The mixture is cooled, precipitated in diethyl ether, washed with acetone and vacuum dried. The solid is dissolved in methanol, precipitated in ether, washed and vacuum dried. Yield 8 g of product soluble in warm water.

Anal. Calcd.: C, 72.7; H, 6.7; N, 6.1; Cl, 7.6. Found: C, 69.8; H, 7.1; N, 5.4; Cl, 6.8.

EXAMPLE IX

Quaternization of Copoly[styrene : dimethylaminopropylacrylamide] with 1-chloromethylnaphthalene A solution of 10 g of copoly[styrene : dimethylaminopropylacrylamide], and 7.0 g chloromethylnaphthalene in 100 ml benzyl alcohol is heated overnight under nitrogen in a 100°C. bath. The mixture is cooled, isolated and purified as in Example VIII. Yield 10 g of product soluble in warm water and methanol.

Anal. Calcd.: C, 71.5; H, 8.1; N, 5.6; Cl, 7.6. Found: C, 74.4; H, 7.6; N, 6.4; Cl, 8.1.

EXAMPLE X

Quaternization of Copoly[styrene : Dimethylaminoethyl Methacrylate] with 1-chloromethylnaphthalene A solution of 5 g of copoly[styrene : dimethylaminoethyl methacrylate] and 10 g of 1-chloromethylnaphthalene in 50 ml of dimethylformamide is heated overnight in a 100° C. bath. The mixture is cooled and the product isolated and purified as in the previous example. Yield 7 g of product soluble in water and methanol.

Anal. Calcd.: C, 74.1; H, 7.3; N, 3.2; Cl, 8.1. Found: C, 69.8; H, 7.4; N, 3.4; Cl, 8.6.

EXAMPLE XI

Preparation of Copoly[N-acrylamidopropyl-N,N-dimethyl-N-vinyloxycarbomethylammonium chloride : N-benzyl-N,N-dimethyl-N-vinyloxycarbomethylammonium chloride]

A solution of 36 g (0.3 mole) of poly(vinyl chloroacetate) and 20.25 g (0.15 mole) of dimethylbenzylamine in 500 ml dimethylformamide is allowed to stand overnight at room temperature. The mixture is precipitated in ether, washed and vacuum dried.

Ten grams of this solid (0.0267 mole), 7.7 g. (0.25 mole) of dimethylaminopropylacrylamide and 150 ml of dimethylformamide is tumbled overnight. The solution is precipitated in diethyl ether, washed with acetone and vacuum dried. Yield 10.5 g.

Anal. Calcd.: C, 56.2; H, 7.4; Cl, 13.3; N, 7.9. Found: C, 56.1; H, 7.4; Cl, 12.9; N, 6.4.

EXAMPLE XII

Preparation of Copoly[2-vinylnaphthalene : N-(1-Naphthylmethyl)-N,N-dimethyl-N-maleimido-propylammonium chloride]

Nine grams of 1-chloromethylnaphthalene is added to a solution of 9 g of copoly[2-vinylnaphthalene : dimethylaminopropylmaleimide] in 32 ml of dimethylformamide. After tumbling for 3 days, the mixture is precipitated in ether, washed and vacuum dried. Yield 12.7 g.

Anal. Calcd.: C, 74.3; H, 7.2; Cl, 6.9; N, 5.4. Found: C, 71.1; H, 6.6; Cl, 6.6; N, 5.7.

EXAMPLE XIII

Preparation of Copoly[styrene-N-(3-dimethylaminopropyl)maleimide]

A solution of 250 g of copoly(styrene-maleic anhydride (commercially available from the Monsanto Chemical Company under the tradename of Lytron 810) in 2500 ml of dry dimethylformamide is made by stirring in a 5-liter flask, containing a reflux condenser, thermometer, stirrer, and dropping funnel. The mixture is heated to 110°C and 230 g of N,N-dimethyl-1,3-propanediamine is added slowly at a rate to keep the mixture boiling slightly. Polymer precipitates as a gummy mass at first but goes back into solution after about half of the amine is added. The condenser is replaced by a distillation column and about 500 ml of material is removed by distillation with stirring. The residue is cooled, precipitated in water, collected by filtration and air-dried at room temperature for 2 days. The solid is dissolved in acetone, and again precipitated in water and air-dried. Yield = 260 g of off-white, friable solid.

Anal. Cal. for $C_{17}H_{22}N_2O_2$: C, 71.4; H, 7.7; N, 9.8 Found: C, 72.0; H, 7.5; N, 9.0

EXAMPLE XIV

Preparation of Copoly[styrene-N-benzyl-N,N-dimethyl-N-(3-maleimidopropyl)ammonium chloride]

The polymer prepared in Example XIII above (110 g) is dissolved in 1100 ml of N,N-dimethylformamide and 100 g of benzyl chloride is added rapidly with stirring. After standing about 16 hours, the mixture is heated 2 hours on a steam bath. The product is precipitated in acetone, washed twice with acetone and dried under vacuum. The solid is redissolved in methanol, reprecipitated in dioxane, washed with acetone, and vacuum-dried to yield about 130 g of off-white solid.

Anal. Cal. for $C_{24}H_{29}N_2O_2C_1$: C, 69.8; H, 7.0; N, 6.8; Cl, 8.6. Found: C, 69.5; H, 7.1; N, 6.6; Cl, 8.3

As indicated above, the polymers of this invention are useful in the mordant layer of dye image-receiving elements.

This is illustrated in the following examples:

EXAMPLE XV

Single Layer Dye Image-Receiving Element Containing Copoly[styrene-N-benzyl-N,N-dimethyl-N-(3-maleimidopropyl) ammonium Chloride] as Polymeric Mordant without Vehicle A dye image-receiving element is prepared by coating the following liquid composition on a polyethylene coated paper support.

| | |
|---|---|
| Polymeric mordant (6% aqueous soln.) | 480 g |
| Coating aid* (5% aqueous soln.) | 10 g |
| Distilled water to 500 g | |

*The coating aid is isoctyl phenyl polyethoxy ethanol (commercially available from Rohm and Haas under the tradename of Triton X-100)

The polymeric mordant is prepared in a manner after Examples XIII and XIV.

The coating is prepared to contain 200 milligrams of the polymeric mordant per square foot of support.

The element thus formed is then tested by employing the photosensitive element and process as described in Example 1 of Beavers and Bush U.S. Pat. No. 3,445,228. After completion of development, the receiving element is separated from the photosensitive element, resulting in the transfer of a well-defined dye image having relatively good color balance and dye stability.

EXAMPLE XVI

Multilayer Dye Image-Receiving Element Containing Copoly[styrene-N-benzyl-N,N-dimethyl-N-(3-maleimidopropyl) ammonium chloride] as Polymeric Mordant in Gelatin and a Polymeric Acid Scavenging Layer A dye image-receiving element is prepared by coating the following liquid composition as the top most layer of a polyethylene coated paper support containing a polyacrylic acid layer:

| | |
|---|---|
| Gelatin (10% aqueous soln.) | 56.0 g |
| Polymeric mordant (6% aqueous soln.) | 371.0 g |
| Coating aid* (5% aqueous soln.) | 10.0 ml |
| Formaldehyde (10% aqueous soln.) | 0.3 ml |
| Distilled water to 500 g | |

*The coating aid is isoctyl phenyl polyethoxy ethanol (commercially available from Rohm and Haas under the tradename of Triton X-100).

The polymeric mordant is prepared in a manner after Examples XIII and XIV.

The coating is prepared to contain 200 milligrams polymeric mordant and 50 milligrams gelatin per square foot of support.

The element thus formed is then tested by employing the photosensitive element and process as described in Example 1 of Beavers and Bush U.S. Pat. No. 3,445,228. After completion of development, the receiving element is separated from the photosensitive element, resulting in the transfer of a well-defined dye image having relatively good color balance and dye stability.

EXAMPLE XVII

Preparation of Poly[-methyl--mthyl-5-vinylpyridine: 1-benzyl-2-methyl-5-vinylpyridinium chloride]

A solution of 17 g of poly(2-methyl-5-vinylpyridine) (commercially available from the Ionac Chemical Co., Division of Pfaudler Co., Birmingham, New Jersey, as Ionac Resin PP-2020X) in 170 ml methoxyethanol and 15 g of benzyl chloride is heated on a steampot for 72 hours. The solution is cooled, precipitated in ethyl acetate washed and vacuum dried. The solid is dissolved in methanol, precipitated in ether, washed and vacuum dried. Yield: 26.4 g.

Anal. Cal.: C, 73.3; H, 6.5; N, 6.7; Cl, 14.5 Found: C, 65.0; H, 6.9; N. 6.2; Cl, 12.4

EXAMPLE XVIII

Multilayer Dye Image-Receiving Element Containing Copoly[2-methyl-5-vinyl-pyridine: 1-Benzyl-2-methyl-5-vinylpyridinium chloride]

A dye image-receiving element is prepared by coating poly(methyl vinyl ether/maleic anhydride) on a polyethylene coated paper support. On the polymeric acid anhydride layer is coated a white pigmented interlayer formed from $TiO_2$ and a polymeric binder, in accordance with the teaching of Beavers and Bush, U.S. Pat. No. 3,445,228. Over this layer is coated the following composition containing the above polymeric mordant:

| | |
|---|---|
| Gelatin (10% aqueous soln.) | 154 g |
| Polymeric Mordant (10% aqueous soln.) | 308 g |
| Formaldehyde (10% aqueoust soln.) | 1.54 ml |
| Coating Aid* (5% aqueous soln.) | 10 ml |
| Distilled water to 500 g | |

*The coating aid is isooctyl phenyl polyethoxy ethanol (commercially available from Rohm and Haas tradename of Triton X-100).

The polymeric mordant is prepared in a manner after Example XVII

The polymeric mordant coating is prepared to contain 400 milligrams of polymeric mordant and 200 milligrams of gelatin per square foot of support.

The element thus formed is then tested by employing the photosensitive element and process as described in Example 1 of Beavers and Bush U.S. Pat. No. 3,445,228. After completion of development, the receiving element is separated from the photosensitive element, resulting in the transfer of a well-defined dye image having relatively good color balance and dye stability.

Mordanting amounts of the novel polymers of the invention can be employed as such from an aqueous or methanolic medium, or can be incorporated in water-permeable hydrophilic organic colloids or other polymeric binder materials and the resulting mixture used in the preparation of dye imbibition printing blanks, receiving layers for color transfer processes, such as those described in Land U.S. Pat. No. 3,362,819, Rogers U.S. Pat. No. 2,983,606, Whitmore U.S. Pat. No. 3,227,552 and U.S. Pat. No. 3,227,550, and in antihalation layers such as those described in Jones et al U.S. Pat. No. 3,282,699. Satisfactory colloids which can be used for this purpose include any of the hydrophilic colloids generally employed in the photographic field, including, for example, gelatin, colloidal albumin, polysaccharides, cellulose derivatives, synthetic resins such as polyvinyl compounds, including polyvinyl alcohol derivatives, acrylamide polymers and the like. In addition to the hydrophilic colloids, the vehicle or binding agent can contain colloids such as dispersed polymerized vinyl compounds, particularly those which increase the dimensional stability of photographic materials. Suitable compounds of this type include water-insoluble polymers and copolymers of alkyl acrylates or methacrylates. In general a mordanting amount can be employed in a dye mordanting or dye image-receiving element layer. A binder may or may not be used along with the polymeric mordant in the layer. The amount of dye mordant to be used depends on the amount of dye to be mordanted, the mordanting polymers, the imaging chemistry involved, etc. The amount can be determined easily by one skilled in this art. The dye image-receiving element can comprise a support having the polymeric mordant of this invention thereon. The element may also comprise other layers, such as a polymeric acid layer, and can also include a timing layer as taught in U.S. Pat. No. 3,362,819 or a light reflective interlayer comprising a light reflective white pigment such as $TiO_2$ and the polymeric binder in accordance with the teaching of Beavers and Bush U.S. Pat. No. 3,445,228.

The mordanting polymers of this invention are also especially useful in light-filtering layers, such as in antihalation layers of the type disclosed in Jones and Milton U.S. Pat. No. 3,282,699. Here the light-filtering layer preferably can comprise a hydrophilic colloid and the polymer of this invention. The layer is adapted to contain a dye held or fixed by the mordant.

In addition, the novel mordants of this invention can also be employed in integral negative-receiver photographic elements such as those described in U.S. Ser. No. 27,990 of Cole, filed Apr. 13, 1970, U.S. Ser. No. 27,991 of Barr et al, filed Apr. 13, 1970 and U.S. Pat. No. 3,415,644 issued Dec. 10, 1968. In general, these integral photographic elements comprise a support having thereon a layer containing one or more of the novel mordants described herein and at least one photosensitive silver halide emulsion layer, the silver halide of which has contiguous thereto a dye image-providing material.

When a water-permeable colloid is used, the quantity of mordant employed can be varied, depending upon the particular mordant and its chemical characteristics, as well as the dyes to be fixed in the mordanting layer. In general, the quantity of mordant should be at least 10% by weight, based on the weight of hydrophilic colloid. Larger amounts of mordant can be employed in the hydrophilic colloid layers and amounts as high as 50% by weight, based on the weight of the hydrophilic colloid, give quite useful results.

The mordants can also be used for fixing the dyes, and particularly acid dyes, used in the preparation of photographic filter, antihalation and gelatino-silver-halide emulsion layers. Such layers can be coated on conventional photographic supports, such as flexible sheet supports (e.g., cellulose acetate, polyester films, polyvinyl resins, etc.) or paper, glass, etc.

More than one of the mordanting polymers of this invention can be used together, in a single layer or in two or more layers. The mordanting polymers of this invention can also be used in admixture with other mordants in the same layer or in separate layers of the same element.

The layers containing the polymers of this invention can be prepared from not only aqueous systems but also methanol or alkaline compatible systems as well.

The emulsions containing the interpolymers can be chemically sensitized with compounds of the sulfur group, noble metal salts such as gold salts, reduction sensitized with reducing agents, and combination of these. Furthermore, emulsion layers and other layers present in photographic elements made according to this invention can be hardened with any suitable hardener such as aldehyde hardeners, aziridine hardeners, hardeners which are derivatives of dioxane, oxypolysaccharides such as oxystarch, oxy plant gums, and the like. The emulsion can also contain additional additives, particularly those known to be beneficial in photographic emulsions, including for example, stabilizers or antifoggants, particularly the water soluble inorganic acid salts of cadmium, cobalt, manganese and zinc as disclosed in U.S. Pat. No. 2,829,404, the substituted triazaindolizines as disclosed in U.S. Pat. Nos. 2,444,605 and 2,444,607, speed increasing materials, plasticizers and the like.

Mordanted blanks treated in accordance with this invention are useful for receiving acid dyes from hydrophilic colloid relief images according to prior art techniques. Typical acid dyestuffs which can be transferred to the treated blanks of the invention are Anthracene Yellow GR (400% pure Schultz No. 177), Fast Red S Conc. (Colour Index 176), Pontacyl Green SN Ex. (Colour Index 737), Acid blue black (Colour Index 246), Acid Magenta O (Colour Index 692), Naphthol Green B Conc. (Colour Index 5), Brilliant Paper Yellow Ex. Conc. 125% (Colour Index 364), Tartrazine (Colour Index 640), Metanil Yellow Conc. (Colour Index 138), Pontacyl Carmine 6B Ex. Conc. (Colour Index 57), Pontacyl Scarlet R Conc. (Colour Index 487) and Pontacyl Rubine R Ex. Conc. (Colour Index 179).

The mordants of this invention are evaluated for their degree of matrix poisoning in an Imbibition Dye Transfer Process as follows:

To a fine grain silver bromoiodide emulsion containing 295 g of gelatin/mole of silver halide, there is added some saponin solution as a coating aid, 42 cc of 50 percent aqueous glycerine, and 17.5 cc of a 10 percent formaldehyde solution. The emulsion is coated on a cellulose ester support at a coverage of approximately 390 mg of silver/$ft^2$.

Mordant (1.2 g) and gelatin (2.7 g) are dissolved at 40°C. in sufficient water to make a total weight of 100 g of solution. The pH of the solution is adjusted to 4.2, and 0.17 or of a 10 percent aqueous solution of formaldehyde is added. This solution is then coated over the fine grain silver bromoiodide emulsion layer described above at a coverage of 260 mg of gelatin/$ft^2$.

A series of six transfers of dye are made from a gelatin relief matrix onto strips of the film coating containing the mordant. A new matrix is used for each series of transfers.

After the six transfers are made, the minimum density of the matrix is measured through a filter complementary in color to that of the transferred dye. The minimum density of the unused matrix is subtracted from this density to give the dye stain on the matrix which is taken as an indication of the degree of matrix poisoning.

The matrix for each transfer is dyed for 2 minutes 50 seconds in an acid dye bath at a temperature of 90°F. The dyed matrix is removed from the dye bath, allowed to drain 10 seconds, washed for 15 seconds in running water at a temperature of 80°F. and immediately blown off with an air squeegee to remove surface water. The dyed matrix is then rolled into contact with a strip of the mordanted film coating which has been soaked in distilled water for 1 minute 15 seconds at room temperature. The two strips are held in contact for 45 seconds while maintaining the temperature at 105°F. At the end of 45 seconds the matrix and transfer are separated. The mordanted coating containing the transferred dye image is placed in a non-hardening acid fix bath to remove the silver halide after which it is given a short wash and dried. The matrix is then washed approximately for 1 minute in running water, squeegeed and redyed for the next transfer in the series.

The mordants tosted are identified in the following Table 1.

Table 1

| | Mordanting Results | | |
|---|---|---|---|
| Reference Number | General Formula | R | $X^{\ominus}$ |
| A | 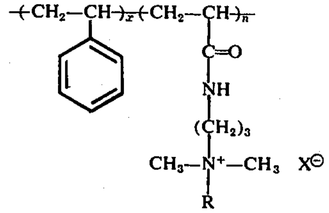 | $CH_3$— (Control) | $C_7H_7SO_3^{\ominus}$ |
| B | As Above | 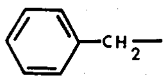 | $Cl^{\ominus}$ |
| C | As Above | 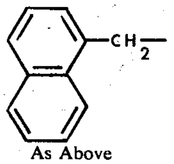 | $Cl^{\ominus}$ |
| D | As Above | As Above | $Cl^{\ominus}$ |
| E | As Above | 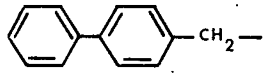 | $Cl^{\ominus}$ |

Table 1-continued
| Reference Number | General Formula Mordanting Results | R | $X^{\ominus}$ |
| --- | --- | --- | --- |
| F | 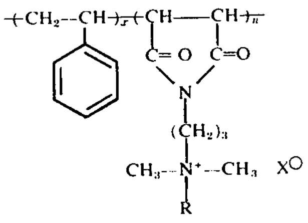 | $CH_3$— (Control) | $C_7H_7SO_3^-$ |
| G | As Above | 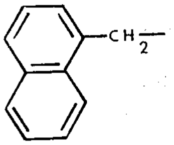 | $Cl^{\ominus}$ |
| H | As Above |  | $Cl^{\ominus}$ |
| I | 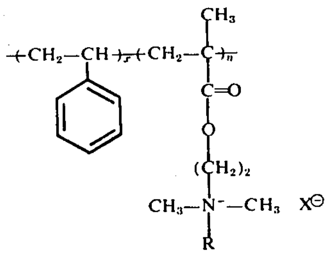 | $CH_3$— (Control) | $C_7H_7SO_3^{\ominus}$ |
| J | As Above | 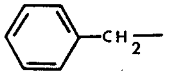 | $Cl^{\ominus}$ |
| K | As Above | 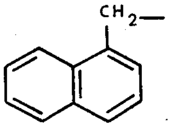 | $Cl^{\ominus}$ |
| L | 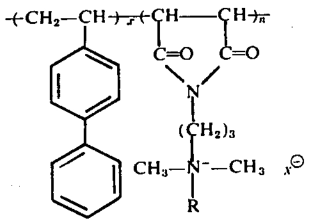 | $CH_3$— (Control) | $C_7H_7SO_3^{\ominus}$ |
| M | As Above | 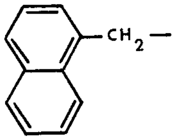 | $Cl^{\ominus}$ |
| N | 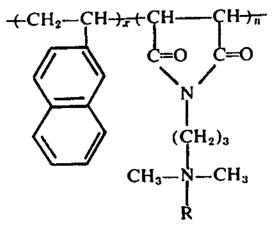 | $CH_3$— (Control | $C_7H_7SO_3^{\ominus}$ |

Table 1-continued

| Reference Number | General Formula | Mordanting Results R | X⊖ |
|---|---|---|---|
| O | As Above | 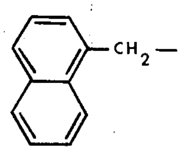 | $Cl^{\ominus}$ |
| P | 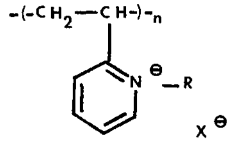 | $CH_3$ — (Control) | $C_7H_7SO_3^{\ominus}$ |
| Q | As Above | 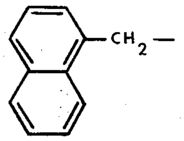 | $Cl^{\ominus}$ |
| R | As Above | 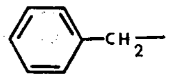 | $Cl^{\ominus}$ |

The testing results are reported in the following Table 2:

Table 2

| Ref. No. | Matrix Stain | Mordanting Results Definition vs *Z | Density vs Z | Remarks |
|---|---|---|---|---|
| A | 0.11 | < | < | Definition only slightly less |
| B | 0.07 | " | " | Definition equal on first transfer but degraded after the first. |
| C | 0.03 | > | | |
| D | 0.02 | > | > | |
| H | 0.02 | << | | Hazy after processing. |
| F | 0.06 | " | " | |
| G | 0.01 | " | | |
| H | 0.02 | " | | |
| I | 0.11 | > | " | Image poisoning after first transfer. |
| J | 0.12 | >> | | |
| K | 0.01 | >" | | |
| L | 0.13 | < | to < | Density decreased with successive transfers. |
| M | <0.01 | " | " | No visible matrix poisoning after the sixth transfer. |
| N | 0.11 | | | Image poisoning. |
| O | <0.01 | >> | < | Density slightly less |

Table 2-continued

| Ref. No. | Matrix Stain | Mordanting Results Definition vs *Z | Density vs Z | Remarks |
|---|---|---|---|---|
| P | high | | | Bad image poisoning after first transfer. |
| Q | 0.02 | < | " | |
| R | 0.28 | < | | Image poisoning. |

*Z The guanylhydrazone of poly(methyl vinyl ketone) is used as a standard mordant for comparison (See U. S. Patent 2,945,006).

The following example is included to further show the advantageous effect of the mordants of the invention on matrix stain compared to interpolymers containing alkyl-substituted quaternary nitrogen atoms and to demonstrate the adverse effect of carboxyl groups in the copolymers. The compounds were all tested according to the general procedure discussed above and all the data has been reduced to resolutions of the image formed on the first transfer strip in terms of lines per millimeter. The data is, of course, relative to the controls. The compounds tested are identified in the following Table 3.

Table 3

| Compound | Name | Structure |
| --- | --- | --- |
| I | Copoly(methacrylic acid-N,N-diethyl-N-methyl-N-methacryloyl-oxyethylammonium p-toluene-sulfonate) | 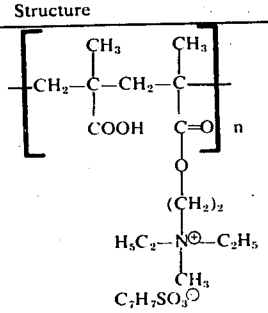 |
| II | Poly(N,N-diethyl-N-methyl-N-methacryloyloxyethylammonium p-toluenesulfonate) | 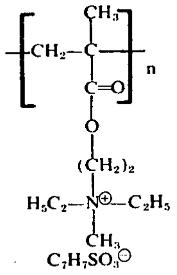 |
| III | Poly(2-vinyl-N-methyl-pyridinium p-toluenesulfonate | 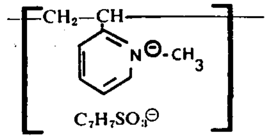 |
| IV | The guanylhydrazone of Poly(methyl vinyl ketone) glycolic acid salt. | 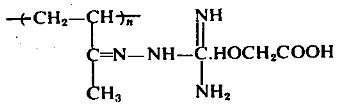 |
| V | Poly[N-(3-acrylamido-propyl)-N,N,N-trimethyl-ammonium p-toluenesulfonate] | 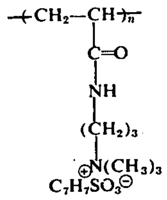 |
| VI | Copoly[styrene-N-(3-acrylamidopropyl)-N,N,N-trimethylammonium p-toluenesulfonate] | 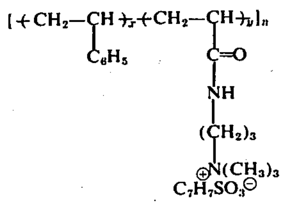 |
| VII | Copoly[styrene-N-(3-acrylamidopropyl)-N-benzyl-N,N-dimethyl-ammonium chloride] | 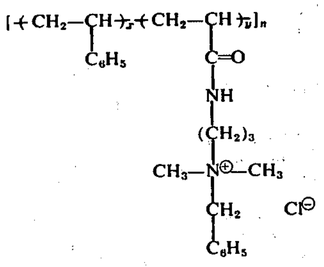 |
| VIII | Copoly[styrene-N-(3-acrylamidopropyl)-N,N-dimethyl-N-(1-naphthyl-methyl)ammonium chloride] | 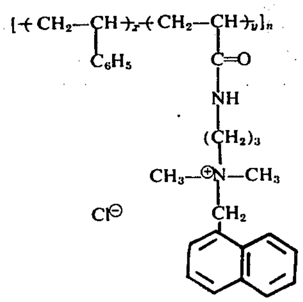 |

Table 3-continued

| Compound | Name | Structure |
| --- | --- | --- |
| IX | Copoly[styrene-N-(3-acrylamidopropyl)-N,N,N-trimethylammonium p-toluene-sulfonate] | 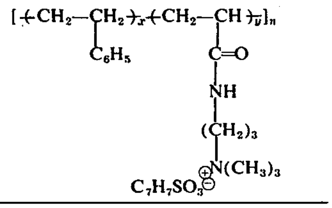 |

The results of the tests are reported in Table 4 below.

Table 4

| Compound | Resolution Lines/mm | Matrix Stain | Comments |
| --- | --- | --- | --- |
| I | | | This mordant permits diffusion of the dye and is unsatisfactory. It produces fog and increases threshold speed in emulsions in contact with filter layers. |
| II | | High >0.28 | This mordant gave excellent definition, at least as good as Compound III, and a transfer density just slightly lower than Compound III. |
| III | 30 | High >0.28 | |
| IV | 42 | 0.07 | |
| V | 30 | High >0.28 | |
| VI | 42 | 0.15 | |
| VII | 42 | 0.07 | |
| VIII | 42 | 0.02 | |
| IX | | 0.11 | |

The invention has been described in considerable detail with reference to preferred embodiments thereof, but it will be understood that variations and modifications can be effected within the spirit and scope of the invention as described hereinabove and as defined in the appended claims.

We claim:

1. An element comprising a support having a layer thereon which comprises a mixture of 1) a hydrophilic colloid and 2) a polymer comprising units represented by the following formula in copolymerized relationship with units of at least one other ethylenically unsaturated monomer:

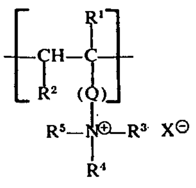

wherein $R^1$ and $R^2$ are hydrogen atoms or lower alkyl groups and $R^2$ can additionally be a group containing at least one aromatic nucleus; Q can be a divalent alkylene radical, a divalent arylene radical, a divalent aralkylene radical, a divalent arylenealkylene radical,

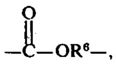, 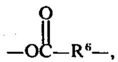, or 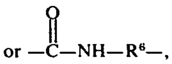, wherein $R^6$ is an alkylene radical, or $R^2$ can be taken together with Q to form a

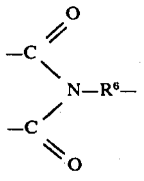

group; $R^3$, $R^4$ and $R^5$ can be lower alkyl or aryl, or $R^3$ and $R^4$ and the nitrogen atom to which they are attached can together with Q represent the atoms and bonds necessary to form a quaternized nitrogen-containing heterocyclic ring, and $X^\ominus$ is a monovalent negative salt forming radical or atom in ionic relationship with the positive salt forming radical; wherein said polymer is substantially free of carboxy groups and wherein the positive salt forming radical of said polymer comprises at least two aryl groups for each quaternary nitrogen atom in said polymer.

2. An element according to claim 1 wherein the positive salt forming radical of said polymer comprises at least three aromatic nuclei for such quaternary nitrogen atom in said polymer.

3. An element according to claim 1 wherein said hydrophilic colloid is gelatin.

* * * * *